US012642999B2

(12) United States Patent
Hulinsky et al.

(10) Patent No.: US 12,642,999 B2
(45) Date of Patent: Jun. 2, 2026

(54) ADMIXING SYSTEM FOR FIRE-EXTINGUISHING SYSTEMS AND METHOD FOR OPERATING SUCH AN ADMIXING SYSTEM

(71) Applicant: FIREDOS GMBH, Wölfersheim (DE)

(72) Inventors: Andreas Hulinsky, Dresden (DE); Alexander Schlepp, Buseck (DE)

(73) Assignee: FIREDOS GMBH (DE)

( * ) Notice: Subject to any disclaimer, the term of this patent is extended or adjusted under 35 U.S.C. 154(b) by 783 days.

(21) Appl. No.: 17/767,310

(22) PCT Filed: Oct. 2, 2020

(86) PCT No.: PCT/EP2020/077630

§ 371 (c)(1),
(2) Date: Apr. 7, 2022

(87) PCT Pub. No.: WO2021/069319

PCT Pub. Date: Apr. 15, 2021

(65) Prior Publication Data

US 2022/0401771 A1 Dec. 22, 2022

(30) Foreign Application Priority Data

Oct. 8, 2019 (DE) ........................ 102019215407.7

(51) Int. Cl.
*A62C 5/02* (2006.01)
*A62C 5/00* (2006.01)

(52) U.S. Cl.
CPC ................ *A62C 5/02* (2013.01); *A62C 5/002* (2013.01)

(58) Field of Classification Search
CPC ......... A62C 5/02; A62C 5/002; B01F 23/451; B01F 23/49; B01F 35/717613; B01F 35/831

(Continued)

(56) References Cited

U.S. PATENT DOCUMENTS 1,795,749 A 3/1931 Winters
2,347,944 A 5/1944 Fowler (Continued)

FOREIGN PATENT DOCUMENTS

CN 85105455 1/1987
CN 204275631 4/2015

(Continued)

OTHER PUBLICATIONS

Official Action with English Translation for Russia Patent Application No. 2022111967, dated Dec. 27, 2022, 22 pages.

(Continued)

*Primary Examiner* — Arthur O. Hall
*Assistant Examiner* — Anna Thi Ho
(74) *Attorney, Agent, or Firm* — Sheridan Ross P.C.

(57) ABSTRACT

An admixing system for fire-extinguishing installations is provided for generating a mixture (premix) of extinguishing medium and extinguishing medium additive by admixing an extinguishing medium additive to an extinguishing medium. The admixing system has a motor that can be driven by a flow of extinguishing medium, an admixing pump that is connected to the motor and serves for supplying the extinguishing medium additive to an extinguishing medium additive inlet line, an admixing line, and an extinguishing medium additive outlet line from which the extinguishing medium additive is admixed to the extinguishing medium in the admixing line. The admixing pump is a piston pump having multiple cylinders and at least two outputs connected to the cylinders. At least one first output, through which return flow is possible, can be switchably fluidically connected either to a return flow line through which the extinguishing medium additive flows back to the admixing pump, or to the extinguishing medium additive outlet line. If the extinguishing medium additive flows from the return-flow- (Continued)

compatible output back to the admixing pump, it is therefore not admixed to the extinguishing medium in the admixing line. Thus, the admixing rate can be changed simply by means of this switching.

10 Claims, 1 Drawing Sheet

(58) Field of Classification Search
USPC ........................................................... 169/14
See application file for complete search history.

(56) References Cited

U.S. PATENT DOCUMENTS

| | | | | |
|---|---|---|---|---|
| 2,491,351 | A | 12/1949 | Zeitllin | |
| 3,814,547 | A | 6/1974 | Kitrilakis et al. | |
| 3,903,968 | A | 9/1975 | Livingston | |
| 4,257,440 | A * | 3/1981 | Hunter | G05D 11/008 137/99 |
| 4,436,487 | A * | 3/1984 | Purvis | A62C 25/00 417/442 |
| 4,645,009 | A | 2/1987 | Hawelka et al. | |
| 4,830,589 | A | 5/1989 | Pareja | |
| 4,859,157 | A | 8/1989 | Adler | |
| 4,899,825 | A | 2/1990 | Bosoni et al. | |
| 5,174,383 | A * | 12/1992 | Haugen | G05D 11/132 169/44 |
| 5,295,880 | A | 3/1994 | Parker | |
| 5,402,569 | A | 4/1995 | Maki et al. | |
| 5,979,564 | A * | 11/1999 | Crabtree | A62C 5/02 169/15 |
| 6,009,953 | A | 1/2000 | Laskaris et al. | |
| 6,074,176 | A * | 6/2000 | Conkin | A62C 5/02 417/188 |
| 6,085,586 | A | 7/2000 | Arvidson et al. | |
| 6,684,959 | B1 * | 2/2004 | Juidici | A62C 5/02 169/44 |
| 6,725,940 | B1 * | 4/2004 | Klein | A62C 5/02 239/69 |
| 7,563,076 | B2 * | 7/2009 | Brunet | F04B 49/065 92/13.1 |
| 8,789,614 | B2 | 7/2014 | Hosfield | |
| 2003/0196703 | A1 | 10/2003 | Decler et al. | |
| 2004/0050556 | A1 * | 3/2004 | Baker | A62C 5/02 169/14 |
| 2005/0023006 | A1 * | 2/2005 | Vonhof | A62C 5/02 169/44 |
| 2006/0180321 | A1 | 8/2006 | Yoshida | |
| 2007/0209807 | A1 * | 9/2007 | Kruger | A62C 5/02 169/15 |
| 2010/0193201 | A1 * | 8/2010 | Zeller | A62C 99/0036 169/46 |
| 2011/0056707 | A1 | 3/2011 | Gamble et al. | |
| 2012/0241029 | A1 | 9/2012 | Carollo | |
| 2013/0048099 | A1 | 2/2013 | Crabtree | |
| 2013/0253711 | A1 | 9/2013 | McLoughlin et al. | |
| 2014/0369873 | A1 | 12/2014 | Bassine | |
| 2016/0237843 | A1 | 8/2016 | Manicone | |
| 2016/0348471 | A1 | 12/2016 | Kenney et al. | |
| 2018/0272164 | A1 | 9/2018 | Knight | |
| 2019/0168047 | A1 | 6/2019 | Conboy | |
| 2019/0219051 | A1 | 7/2019 | Kraige et al. | |
| 2019/0229582 | A1 | 7/2019 | Ito et al. | |
| 2019/0262637 | A1 | 8/2019 | Statter | |
| 2019/0374800 | A1 | 12/2019 | Sivertsen | |
| 2020/0230450 | A1 * | 7/2020 | Jonker | A62C 5/027 |
| 2021/0346740 | A1 | 11/2021 | Jiang et al. | |
| 2022/0072351 | A1 * | 3/2022 | Jungmair | B01F 25/3141 |

FOREIGN PATENT DOCUMENTS

| | | | |
|---|---|---|---|
| CN | 205626812 | 10/2016 | |
| CN | 106468252 | 3/2017 | |
| CN | 107349545 | 11/2017 | |
| CN | 107376177 | 11/2017 | |
| CN | 207970383 | 10/2018 | |
| CN | 109513140 | 3/2019 | |
| CN | 208871102 | 5/2019 | |
| CN | 110087741 | 8/2019 | |
| CN | 211636052 | 10/2020 | |
| DE | 806184 | 6/1951 | |
| DE | 3131522 | 4/1983 | |
| DE | 3503788 | 2/1986 | |
| DE | 3812794 | 10/1989 | |
| DE | 4227037 | 2/1994 | |
| DE | 102008059638 | 6/2010 | |
| DE | 102019215406 | 4/2021 | |
| EP | 0296652 | 12/1988 | |
| EP | 0647458 | 4/1995 | |
| EP | 1595579 | 4/2010 | |
| EP | 3292886 | 3/2018 | |
| GB | 196608 | 2/1924 | |
| GB | 731102 | 6/1955 | |
| GB | 2375301 | 11/2002 | |
| IT | MI20091679 | 4/2011 | |
| KR | 20-0378222 | 3/2005 | |
| KR | 10-2018-0052462 | 5/2018 | |
| RU | 2257527 | 7/2005 | |
| RU | 2431061 | 10/2011 | |
| RU | 2530059 | 10/2014 | |
| RU | 195411 | 1/2020 | |
| SU | 41351 | 1/1935 | |
| WO | WO 2006/000177 | 1/2006 | |
| WO | WO 2006/119923 | 11/2006 | |
| WO | WO 2007/140758 | 12/2007 | |
| WO | WO 2011/128707 | 10/2011 | |
| WO | WO-2016048136 A1 * | 3/2016 | A62C 37/50 |
| WO | WO 2017/123957 | 7/2017 | |
| WO | WO 2018/077811 | 5/2018 | |

OTHER PUBLICATIONS

U.S. Appl. No. 17/762,229, filed Mar. 21, 2022, Schlepp.

U.S. Appl. No. 17/767,327, filed Apr. 7, 2022, Hulinsky et al.

Official Action with English Translation for China Patent Application No. 202080070111.3, dated Nov. 9, 2022, 10 pages.

Gao Jiaquan "The Structure and Overhaul of Automobile Engine," Beijing Institute of Technology Press, Jul. 2013, p. 153.

D Roos "Data Sheet Proportioner FD20000 for Stationary Extinguishing Systems," FireDos GmbH, Sep. 2018, 4 pages [retrieved online Jan. 13, 2021 from: www.firedos.com/downloads/en/DATA-sHEET-FireDos_FD20000-stationary.pdf].

International Search Report and Written Opinion for International (PCT) Patent Application No. PCT/EP2020/077630, dated Feb. 2, 2021, 12 pages.

English Translation of the International Search Report for International (PCT) Patent Application No. PCT/EP2020/077630, dated Feb. 2, 2021, 3 pages.

* cited by examiner

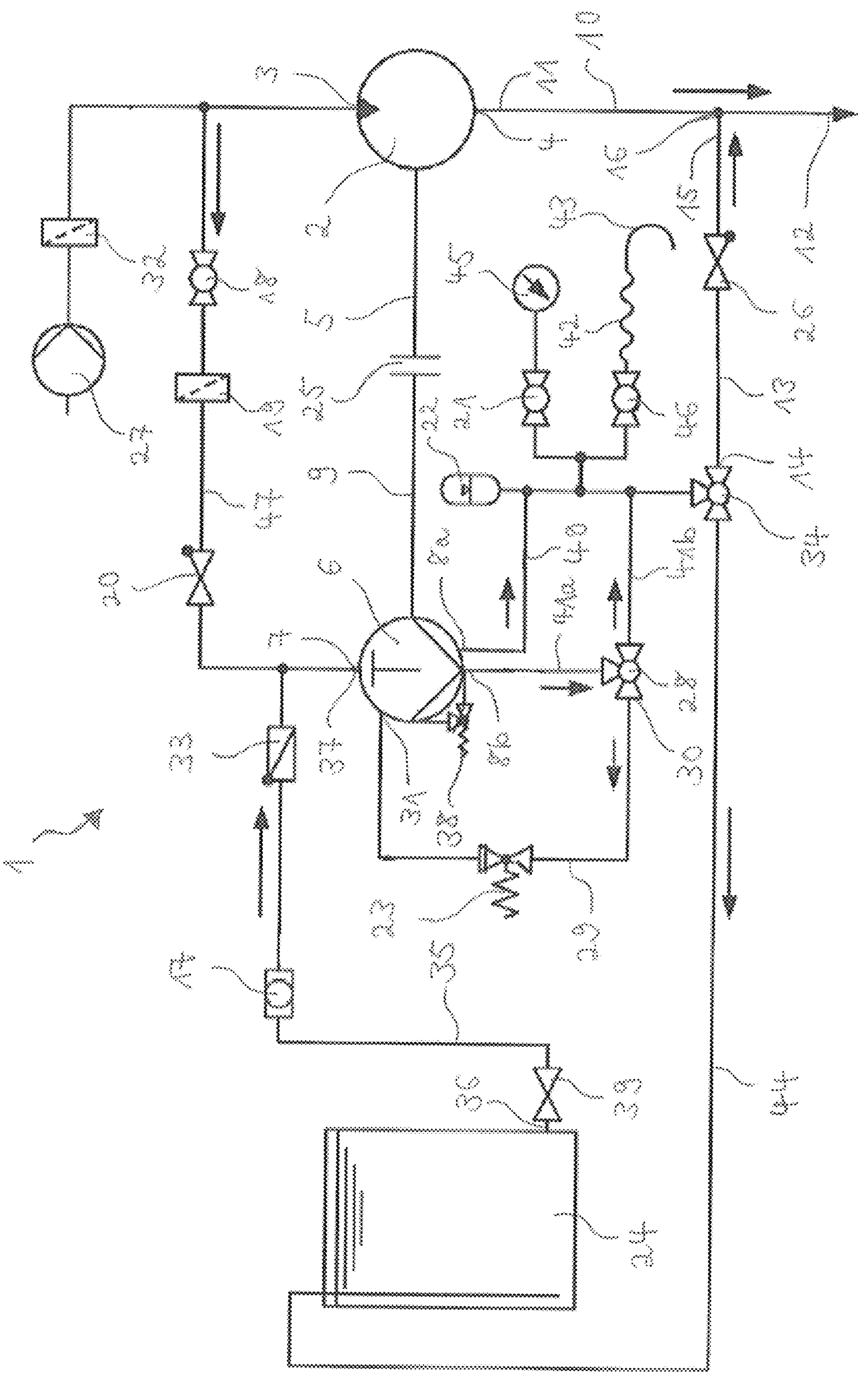

ADMIXING SYSTEM FOR FIRE-EXTINGUISHING SYSTEMS AND METHOD FOR OPERATING SUCH AN ADMIXING SYSTEM

CROSS REFERENCE TO RELATED APPLICATIONS

This application is a national stage application under 35 U.S.C. 371 and claims the benefit of PCT Application No. PCT/EP2020/077630 having an international filing date of 2 Oct. 2020, which designated the United States, which PCT application claimed the benefit of German Patent Application No. 102019215407.7 filed 8 Oct. 2019, the disclosures of each of which are incorporated herein by reference in their entireties.

The present invention relates to an admixing system for fire extinguishing systems. A fire extinguishing system in the sense of the present invention is a system comprising a pump, a system of lines, and a foaming agent admixing system by means of which an extinguishing agent can be discharged, particularly through nozzles, foam tubes or foam generators. The fire extinguishing system can be a stationary system such as a fire extinguishing system in a tank farm with a permanently installed so-called monitor; i.e. a large jet nozzle, or even a permanently mounted sprinkler system in a building. It can however also be a portable system on a vehicle or a roll-on/roll-off container.

Such fire extinguishing systems are usually operated with water as the extinguishing agent. Yet it is advantageous in many cases for the extinguishing agent to be foamed before it being deployed onto the fire to be fought so that the discharged extinguishing agent forms a long-lasting blanket of extinguishing agent able to smother the fire. To that end, an extinguishing agent additive, a foaming agent in this case, is usually initially mixed into the extinguishing agent at a specific rate. The mixture of extinguishing agent/extinguishing agent additive (the so-called "premix") is then foamed in a nozzle under a feed of air and discharged onto the fire to be extinguished. The volumetric ratio of extinguishing agent additive to extinguishing agent, the so-called admixture rate, is typically between 0.5% and 6%.

Another extinguishing agent additive able to be mixed with the extinguishing agent is a surfactant or "wetting agent" which reduces the surface tension of the extinguishing agent, in particular the extinguishing water. This is advantageous when fighting forest fires, for example, because the extinguishing water can thereby bathe larger areas, particularly on the leaves of trees, and can thus be used more efficiently. Furthermore, due to the reduced surface tension, the extinguishing water can penetrate deeper into the forest soil in order to extinguish deeper hotspots, for example.

There are also foaming agents likewise able to be used as wetting agents (potentially at other admixture rates, particularly at a minimum admixture rate of 0.1%).

The invention will to some extent be described in the following using the example of water as an extinguishing agent and foaming agent as an extinguishing agent additive. However, this is not to be understood as being limiting. The invention can just as equally be used in the admixture of any extinguishing agent additives to any extinguishing agents.

For operation of the fire extinguishing system with the admixing system, both the extinguishing agent as well as the extinguishing agent additive can be provided in an extinguishing agent tank, or an extinguishing agent additive tank respectively, or also provided via an extinguishing agent supply line or extinguishing agent additive supply line respectively. Further necessitated when the extinguishing agent is provided in an extinguishing agent tank is an extinguishing agent pump which pumps the extinguishing agent out of the extinguishing agent tank, pressurizes it and feeds it to the admixing system. However, the just mentioned components are not part of the admixing system itself.

When the extinguishing agent additive is a foaming agent, the mixture of extinguishing agent and extinguishing agent additive to be produced; i.e. the premix, is then directed as a premix flow through a foaming nozzle in which ambient air is drawn in through the premix flow and mixed with the premix. This activates the foaming agent in the premix and foams the premix such that an extinguishing agent foam can be discharged from the foaming nozzle and deployed onto the fire.

The air needed to foam the foaming agent can also be supplied to the premix in the form of compressed air. Such a system generating compressed air foam is referred to as a OAFS system (compressed air foam system).

Although it is possible for the premix to be produced in advance independently of the fire extinguishing system, it might then need to be stored for a longer period of time. Thus, in many cases, it is more advantageous to not produce the premix until right before the extinguishing agent being applied to the fire to be fought. The admixing system has an admixing pump for this purpose, via which the extinguishing agent additive can be conveyed and added into the extinguishing agent.

In the admixing system relative to the present invention, the admixing pump is driven by a motor which is in turn driven by a flow of the extinguishing agent itself.

In the above-cited, non-limiting example of invention application, the admixing system thus comprises a water motor driven by the extinguishing water flow. The output shaft of the water motor is coupled to the input shaft of the admixing pump to that end, for example by means of a clutch.

The extinguishing agent additive conveyed by the admixing pump is then directed through an extinguishing agent additive outlet line from the admixing pump into an admixing line and mixed into the flow of extinguishing agent there in order to produce the premix.

This configuration of the admixing system, in which the admixing pump is driven by the already present flow of extinguishing agent, has the advantage of the admixing pump not needing any external operating energy, particularly electricity, whereby the admixing system is extremely fail-safe. Furthermore, the output capacity of the admixing pump is substantially proportional to the speed of the motor, which is in turn substantially proportional to the flow rate of the extinguishing agent flow. A substantially constant admixture rate is thereby automatically achieved without the need for further control or regulating devices.

Being able to set different admixture rate values is desirable in an admixing system for fire extinguishing systems. For example, different extinguishing agent additives requiring different admixture rates (e.g. 6% or 4%) can thereby be used or, as noted above, by changing the admixture rate (e.g. from 2% to 0.1%), the same extinguishing agent additive can be used once as a foaming agent and once as a wetting agent.

A structurally simple way of changing the admixture rate in an admixing system of the above-described configuration consists of designing the admixing pump as a piston pump, in particular a plunger pump, and selectively reducing the output capacity of the piston pump by cutting off one or more cylinders. Since the admixture rate is proportional to the output capacity of the admixing pump, a corresponding reduction in the admixture rate thereby also results. In a piston pump having six cylinders, the admixture rate can thereby be reduced from, for example, 6% to 5% by cutting off one cylinder, or from 6% to 4% by cutting off two cylinders.

As defined by the present invention, the "cut-off" of a specific cylinder is to be understood as no extinguishing agent additive conveyed by this cylinder entering directly into the extinguishing agent additive outlet line and thus being mixed into the extinguishing agent in the admixing line.

This can be achieved by mechanically shutting down the piston in the relevant cylinder, thus it not moving and thereby also not conveying any extinguishing agent additive. However, it can also be achieved when the piston continues to function in the respective cylinder without any mechanical change, thus moving and conveying extinguishing agent additive, yet at the same time preventing the extinguishing agent additive from reaching the extinguishing agent additive outlet line. In particular, the extinguishing agent additive conveyed by the respective cylinder can be diverted and conveyed back into the extinguishing agent additive tank, or extinguishing agent additive inlet line respectively, so that it is not lost but instead available for admixing pump redelivery and admixing with the extinguishing agent.

Preferential in practice for the so-called cylinder cut-off is the second cited option since it is easier to control the flow of extinguishing agent additive than to mechanically uncouple pistons from one or more cylinders of the piston pump and shut them down. The following therefore only takes into account this second option for returning extinguishing agent additive to the admixing pump.

Such a recirculating of the extinguishing agent additive conveyed by the individual cylinders of the admixing pump has to date been realized by drilling into the working space of the respective cylinder and running a "bypass line" from the drilling to the input side of the admixing pump. Said bypass line can be opened and closed by a simple stopcock valve, e.g. a ball valve. When the bypass line is in the closed state, it is inactive and the associated cylinder conveys the extinguishing agent additive to the output of the admixing pump like normal. In the open state of the bypass line, the extinguishing agent additive reaching the working space of the associated cylinder flows back to the input of the admixing pump; i.e. the "intake side" of the admixing pump, due to the different pressure conditions.

In the applicant's admixing systems, with the admixing pump having for example three cylinders, the admixture rate can thereby be reduced either from 3% to 2% by cutting off one cylinder or from 3% to 1% by cutting off two cylinders.

However, this solution for cylinder cut-off requires a structural adaptation of the admixing pump which is complex and entails high costs and can additionally adversely affect the operational reliability of the admixing system since the admixing pump supplied by its manufacturer, e.g. in ready-to-use state, needs to subsequently be "manipulated" when constructing the admixing system.

The invention is therefore based on the task of more easily and reliably realizing cylinder cut-off in an admixing system for fire extinguishing systems of the above-described structure.

This task is solved by an admixing system according to claim 1 as well as by a method for its operation according to claim 10. Advantageous further developments of the invention constitute the subject matter of the subclaims.

The invention is based on an admixing system for fire extinguishing systems for admixing an extinguishing agent additive, in particular a foaming agent, to an extinguishing agent, in particular water.

The admixing system has a motor, in particular a water motor, able to be driven by a flow of extinguishing agent, which has an inlet for supplying the extinguishing agent to the motor, in particular from an extinguishing agent tank or from an extinguishing agent supply line, an outlet for discharging the extinguishing agent from the motor, and an output shaft able to be driven by the motor.

The admixing system further comprises an admixing pump for conveying the extinguishing agent additive onward which has an input shaft coupled to the output shaft of the motor, an input for providing the extinguishing agent additive, in particular from an extinguishing agent additive tank or from an extinguishing agent additive supply line, and at least one output for discharging the extinguishing agent additive conveyed by the admixing pump.

The admixing system furthermore comprises an extinguishing agent additive inlet line having a first inlet-side end and a second pump-side end, wherein the pump-side end is fluidly connected to the input of the admixing pump.

The admixing system further comprises an admixing line having a first motor-side end and a second outlet-side end, wherein the motor-side end is fluidly connected to the outlet of the motor.

In addition, the admixing system comprises an extinguishing agent additive outlet line having a first pump-side end and a second admixing line-side end, wherein the pump-side end is fluidly connected to the at least one output of the admixing pump and the admixing line-side end is fluidly connected to the admixing line at an admixture point.

According to the invention, the admixing pump is a piston pump, particularly a plunger pump, which has a plurality of cylinders and at least two outputs, whereby each output is fluidly connected to at least one cylinder and each cylinder is fluidly connected to exactly one output.

According to the invention, the admixing system further comprises a return flow line having a first pump output-side end and a second pump input-side end, wherein at least one first return-flow-capable output of the admixing pump can be switched via a switching device to either be fluidly connected to the pump output-side end of the return flow line or to the pump-side end of the extinguishing agent additive outlet line; the other outputs of the admixing pump which are not capable of return flow are fluidly connected to the pump-side end of the extinguishing agent additive outlet line and the pump input-side end of the return flow line is fluidly connected to the extinguishing agent additive inlet line or to the admixing pump input.

Should the admixing pump have multiple outputs capable of return flow, each return-flow-capable output preferably has its own switching device.

In the present context, the concept of two points within the admixing system being "fluidly connected" can mean that the two points are directly connected such that a fluid, in particular an extinguishing agent or an extinguishing agent additive, is able to flow from one of the two points to the other point. This can particularly be the case when both points are located on one line or at the end of a line and the tubes realizing the lines directly merge at the two points—thus in effect coinciding—such that the interiors of the relevant tubes form a common continuous cavity.

The two points in the admixing system being "fluidly connected" can however also mean that further devices, in particular tubes or even tubing networks, are arranged between the two points such that the fluid can flow from one point to the other through said devices. Preferably, the flow of the fluid is thereby not hindered by flow-regulating or flow-influencing devices such as valves, flaps, pumps or the like.

Cylinder cut-off in the inventive admixing system is implemented in such a way that only the pump head cover of the admixing pump itself needs to be modified while the majority of the pump can be used in its original state. This thereby increases the operational reliability of the admixing system. The realization of the cylinder cut-off is also structurally simple since substantially the only additional elements needing to be provided are the switching device and the return flow line. This thereby solves the task on which the invention is based.

In one preferential embodiment of the invention, a pressure retention valve for generating a counterpressure on the extinguishing agent additive flowing through the return flow line is arranged in the return flow line.

This thereby solves the problem of the pistons all but "idling" in the cylinders which are "shut down," thus those cylinders from which the extinguishing agent additive is returned through the return flow line to the extinguishing agent additive inlet line or to the input of the admixing pump; i.e. substantially without the extinguishing agent additive conveyed by same exerting a counterpressure on the respective piston. By contrast, the remaining cylinders must apply pressure to the extinguishing agent additive in order to be able to convey it through the extinguishing agent additive outlet line to the admixture point. The differing pressure conditions thereby resulting between the individual cylinders of the admixing pump cause overall irregular admixing pump operation.

A suitably designed pressure retention valve allows substantially the same pressure to be set in all of the cylinders of the admixing pump. This thereby ensures the admixing pump runs smoothly, which in turn has a positive effect on noise emission as well as the service life of the admixing pump.

In a further preferential embodiment of the invention, the at least one return-flow-capable output is fluidly connected to exactly one cylinder. The at least one return-flow-capable output can, however, also be fluidly connected to two, three or more than three cylinders.

Which configuration is selected in each individual case depends both on the number of cylinders in the admixing pump as well as on the admixing system's intended applications. For example, in the case of an admixing pump having six cylinders, three cylinders can be fluidly connected to the return-flow-capable output. This then allows reducing the admixture rate from e.g. 6% to 3% in just a single operation, namely by switching the switching device toward the return flow line and thus cutting off the three cited cylinders.

In a further preferential embodiment of the invention, the admixing pump has two, three or more than three return-flow-capable outputs. Provided each return-capable output has its own switching device, a corresponding number of different admixture rates can be set by switching multiple switching devices toward the return flow line. For example, when each cylinder in an admixing pump with six cylinders is fluidly connected to its own flow-capable output, the admixture rate can be reduced for example from 6% to 5%, 4%, 3%, 2% or 1% respectively by cutting off one, two, three, four or five cylinders.

In a further preferential embodiment of the invention, the admixing pump has exactly three cylinders. In practice, this represents a good compromise for an admixing system between the output capacity of the admixing pump and its costs and the flexibility in setting the admixture rate. Thus, in this case, when all three cylinders exhibit the same volume, the admixture rate can be reduced from e.g. 3% to 2% or 1% by cutting off one or two cylinders.

It is however also possible for the three cylinders to exhibit different volumes. For example, should the volume of the first cylinder by itself equate to an admixture rate of 3%, the volume of the second cylinder by itself equate to an admixture rate of 2% and the volume of the third cylinder by itself equate to an admixture rate of 1%, cutting off the first cylinder or the first and second cylinders can reduce the admixture rate from e.g. 3%+2%+1%=6% to 2%+1%=3%, or 1% respectively.

The admixing pump can of course also have a different number of cylinders, in particular exactly one, exactly two, exactly four or more than four cylinders.

In one further preferential embodiment of the invention, the switching device is a directional control valve, particularly a ball valve. This is a structurally simple element for switching fluid flows in a line system.

In a further preferential embodiment of the invention, the switching device can be switched by means of an electric drive. So doing also enables remotely changing the admixture rate via a remote control device such as a control panel of a fire control center by way of the control device actuating the electric drive of the switching device via wired or wireless connection and one or more cylinders in the admixing pump thereby being cut off or respectively restored again.

The invention further relates to a method for operating an admixing system according to the invention having the following steps:

- directing a flow of extinguishing agent to the inlet of the motor,
- driving the motor via the flow of extinguishing agent,
- driving the output shaft of the motor via the motor,
- discharging the extinguishing agent from the outlet of the motor into the admixing line,
- driving the input shaft of the admixing pump via the output shaft of the motor,
- driving the admixing pump via its input shaft,
- supplying the extinguishing agent additive through the extinguishing agent additive inlet line to the input of the admixing pump,
- pumping the extinguishing agent additive via the admixing pump,
- discharging the extinguishing agent additive from the at least one first return-flow-capable output of the admixing pump depending on the position of the switching device in the return flow line or in the extinguishing agent additive outlet line,
- discharging the extinguishing agent additive from the return flow line into the extinguishing agent additive inlet line as need be,
- discharging the extinguishing agent additive from the remaining non-return-flow-capable outputs of the admixing pump into the extinguishing agent additive outlet line, admixing the extinguishing agent additive into the extinguishing agent in the admixing line at the admixture point, dispensing the extinguishing agent/extinguishing agent additive mixture (premix) at the outlet-side end of the admixing line.

Further advantages, features and possible applications of the present invention will become apparent from the following description in conjunction with the FIGURE. Thereby shown is:

FIG. 1: a flowchart of an admixing system according to the invention including additional components of a fire extinguishing system.

The admixing system 1 is supplied with extinguishing water from an extinguishing water tank (not depicted). The extinguishing water is pumped out of the extinguishing water tank by an extinguishing water pump 27 and filtered through a filter 32.

In so doing, the extinguishing water is pressurized before being fed to the water motor 2 at its inlet 3 and driving same. The water motor 2 preferably works according to the reciprocating piston or rotational principle.

The extinguishing water reaches the motor-side end 11 of the admixing line 10 at the outlet 4 of the water motor 2 and is directed from there through the admixing line 10 to its outlet-side end 12 to which are connected the load(s) of the fire extinguishing system such as one or more sprinkler nozzles or a foaming nozzle and firefighting monitor (none of which are shown).

A portion of the extinguishing water pumped by the extinguishing water pump 27 is already branched off into a flushing line 47 ahead (i.e. upstream) of the water motor 2, provided the stopcock 18 disposed therein is open, filtered in a filter 19, and fed as flushing water to the input 7 of an admixing pump 6 via a check valve 20. The admixing pump 6 can in this way be flushed with extinguishing water without a separate flushing water reservoir needing to be provided for the purpose.

The output shaft 5 of the water motor 2 is connected to the input shaft 9 of the admixing pump 6 via a clutch 25. The input shaft 9 of the admixing pump 6 is thus also set into rotational motion with the output shaft 5 of the water motor 2 and in turn drives the admixing pump 6. In the exemplary embodiment, the admixing pump 6 is preferably a plunger pump or an adjustable plunger pump having three cylinders.

The extinguishing agent additive, in particular a foaming agent, is provided in the extinguishing agent additive tank 24. The extinguishing agent additive passes through an extinguishing agent additive inlet line 35 from its inlet-side end 36, which is fluidly connected to the extinguishing agent additive tank 24 via a stopcock 39, a sight glass 17, through which the proper conveying of the extinguishing agent additive can be monitored, and a non-return flap 33 to the pump-side end 37 of the extinguishing agent additive inlet line 35 and thus to the input 7 of the admixing pump 6. The non-return flap 33 prevents flushing water from the flushing line 47 from entering into the extinguishing agent additive inlet line 35. The extinguishing agent additive is drawn in by the admixing pump 6, pressurized by same, and pumped to the outputs 8*a*, 8*b* of the admixing pump 6. The admixing pump 6 is protected from excessively high pressures by a pressure relief valve 38.

The admixing pump 6 in the exemplary embodiment exhibits two outputs 8*a* and 8*b*. The output 8*a* not capable of return flow is fluidly connected to the third cylinder and the return-flow-capable output 8*b* to the first and the second cylinder of the admixing pump 6. In another embodiment, the output 8*a* not capable of return flow can also be connected to two cylinders, for instance the second and third cylinder, and the return-flow-capable output 8*b* to one cylinder, for instance the first cylinder.

From the non-return-flow-capable output 8*a* of the admixing pump 6, the extinguishing agent additive conveyed via the third cylinder first reaches, via a conveying line 40 for the third cylinder, the 3-way "Admixture/Return" ball valve 34, the function of which is described in greater detail below, and in the corresponding "Admixture" position of the 3-way ball valve 34, the pump-side end 14 of extinguishing agent additive outlet line 13.

The conveying line 40 for the third cylinder can be vented via a bleeder valve 46, whereby any air contained in the extinguishing agent additive can flow out into the ambient air via a hose 42 and an overflow opening 43. The pressure of the extinguishing agent additive in the conveying line 40 can be monitored via a manometer 45 connected to the conveying line 40 via a stopcock 21.

A surge tank 22 is further connected to the conveying line 40. The surge tank 22 functions as a snubber and suppresses pulsations in the extinguishing agent additive flow triggered by the oscillating movement of the pistons of the admixing pump 6 preferably configured as a plunger pump. The surge tank 22 can in particular be a compressed air chamber or a tubular membrane pulsation damper.

The extinguishing agent additive passes through a check valve 26 in the extinguishing agent additive line 13 to the admixing line-side end 15 of the extinguishing agent additive outlet line 13 where it is fluidly connected to admixing line 10. This is also the location of admixture point 16 at which the extinguishing agent additive mixes with the extinguishing water. The check valve 26 prevents extinguishing water from being able to enter the extinguishing agent additive outlet line 13 via admixture point 16.

From the return-flow-capable output 8*b* of the admixing pump 6, the extinguishing agent additive conveyed by the first and second cylinders reaches a "cylinder cut-off" ball valve 28 via a first conveying line 41*a* for the first and second cylinders. In the "No cut-off" position of ball valve 28, the extinguishing agent additive likewise reaches the 3-way "Admixture/Return" ball valve 34 via a second conveying line 41*b* for the first and second cylinders and from there, in a corresponding position of the 3-way ball valve 34, enters into the extinguishing agent additive outlet line 13 in the same way as the extinguishing agent additive conveyed by the third cylinder and is mixed with the extinguishing water in the admixing line 10 at admixture point 16.

By synchronizing the flow rates of the extinguishing water flow in admixing line 10 and the extinguishing agent additive flow in extinguishing agent additive outlet line 13, the volumetric ratio between the admixed extinguishing agent additive and extinguishing water; i.e. the admixture rate, is substantially constant, provided that the cylinder has not been cut off, due to the coupling of the water motor 2 to the admixing pump 6. In the just described state of the admixing system 1; i.e. without cylinder cut-off, the admixture rate is for example 3%.

If, on the other hand, the ball valve 28 is set to the "cut-off" position, the extinguishing agent additive conveyed by the first and second cylinders passes from the first conveying line 41*a* into the pump output-side end 30 of the return flow line 29 through said return flow line 29 to its pump input-side end 31 and there re-enters admixing pump 6, either at its input 7 or—as depicted in FIG. 1—at a separate input of the admixing pump 6. A pressure retention valve 23 generates a counterpressure on the extinguishing agent additive flowing through return flow line 29 which creates substantially the same pressure conditions in the first and second cylinders as in the third cylinder of the admixing pump 6 and thereby ensures that the admixing pump 6 runs smoothly.

In this state of the admixing system 1; i.e. when the first and second cylinders are cut off, the admixture rate is for example only 1% instead of 3%, since only the third cylinder still conveys the extinguishing agent additive into extinguishing agent additive outlet line 13 and thus only a third of the maximum amount of extinguishing agent additive is mixed with the extinguishing water per unit of time.

In addition to the above-described "Admixture" position, the 3-way ball valve 34 can also be set into the further "Return" position. In this position of the 3-way ball valve 34, the extinguishing agent additive from conveying line 40 for the third cylinder and, if applicable, from the second conveying line 41*b* for the first and second cylinder is not conducted to admixture point 16 but rather back into the extinguishing agent additive tank 24 via a return line 44.

Further measuring devices (not depicted) can measure the admixture rate during this operating mode of the admixing system 1. The extinguishing agent additive is however not thereby actually mixed into the extinguishing water and is thus not lost due to the control measurement.

LIST OF REFERENCE NUMERALS

1 admixing system
2 water motor
3 water motor inlet
4 water motor outlet
5 water motor output shaft
6 admixing pump
7 admixing pump input
8*a* non-return-flow-capable output of admixing pump
8*b* return-flow-capable output of admixing pump
9 admixing pump input shaft
10 admixing line
11 motor-side end of admixing line
12 outlet-side end of admixing line
13 extinguishing agent additive outlet line
14 pump-side end of extinguishing agent additive outlet line
15 admixing line-side end of extinguishing agent additive outlet line
16 admixture point
17 sight glass
18 stopcock valve
19 filter
20 check valve
21 stopcock valve
22 surge tank
23 pressure retention valve
24 extinguishing agent additive tank
25 clutch
26 check valve
27 extinguishing water pump
28 "Cylinder cut-off" ball valve
29 return flow line
30 pump output-side end of return flow line
31 pump input-side end of return flow line
32 filter
33 non-return flap
34 3-way "Admixture/Return" ball valve
35 extinguishing agent additive inlet line
36 inlet-side end of extinguishing agent additive inlet line
37 pump-side end of extinguishing agent additive inlet line
38 pressure relief valve
39 stopcock valve
40 conveying line for the third cylinder
41*a* first conveying line for the first and second cylinders
41*b* second conveying line for the first and second cylinders
42 hose
43 overflow opening
44 return line
45 manometer
46 bleeder valve
47 flushing line

What is claimed is:

1. An admixing system for fire extinguishing systems for producing an extinguishing agent/extinguishing agent additive mixture (premix) by admixing an extinguishing agent additive to an extinguishing agent, comprising:

a motor capable of being driven by a flow of the extinguishing agent, the motor having:
an inlet for supplying the extinguishing agent to the motor;
an outlet for discharging the extinguishing agent from the motor; and
an output shaft capable of being driven by the motor;

an admixing pump for conveying the extinguishing agent additive, the admixing pump having:
an input shaft coupled to the output shaft of the motor;
a fluid input for providing the extinguishing agent additive; and
at least two fluid outputs for discharging the extinguishing agent additive conveyed by the admixing pump, wherein the admixing pump is a piston pump, which has a plurality of cylinders, and wherein each of the at least two fluid outputs is fluidly connected to at least one cylinder and each cylinder is fluidly connected to exactly one fluid output;

an extinguishing agent additive inlet line having a first inlet-side end and a second pump-side end, wherein the second pump-side end is fluidly connected to the fluid input of the admixing pump;

an admixing line having a first motor-side end and a second outlet-side end, wherein the first motor-side end is fluidly connected to the outlet of the motor;

an extinguishing agent additive outlet line having a first pump-side end and a second admixing line-side end, wherein the first pump-side end is fluidly connected to the at least two fluid outputs of the admixing pump and the second admixing line-side end is fluidly connected to the admixing line at an admixture point; and a return flow line having a first pump fluid output-side end and a second pump fluid input-side end, wherein at least one first return-flow-capable fluid output of the at least two fluid outputs of the admixing pump can be switched via a switching device to either be fluidly connected to the first pump fluid output-side end of the return flow line or to the first pump-side end of the extinguishing agent additive outlet line, wherein other fluid outputs of the at least two fluid outputs of the admixing pump that are not capable of return flow are fluidly connected to the first pump-side end of the extinguishing agent additive outlet line, and wherein the second pump fluid input-side end of the return flow line is fluidly connected to the extinguishing agent additive inlet line or to the fluid input of the admixing pump.

2. The admixing system according to claim 1, wherein a pressure retention valve for generating a counterpressure on the extinguishing agent additive flowing through the return flow line is arranged in the return flow line.

3. The admixing system according to claim 1, wherein the at least one first return-flow-capable fluid output of the admixing pump is fluidly connected to exactly one cylinder.

4. The admixing system according to claim 1, wherein the at least one first return-flow-capable fluid output of the admixing pump is fluidly connected to two, three, or more than three cylinders.

5. The admixing system according to claim 1, wherein the admixing pump has two, three or more than three return-flow-capable fluid outputs.

6. The admixing system according to claim 1, wherein the admixing pump has exactly three cylinders.

7. The admixing system according to claim 1, wherein the admixing pump has one, two, four, or more than four cylinders.

8. The admixing system according to claim 1, wherein the switching device is a directional control valve.

9. The admixing system according to claim 1, wherein the switching device can be switched by means of an electric drive.

10. A method for operating the admixing system according to claim 1 having the following steps:

directing the flow of the extinguishing agent to the inlet of the motor;

driving the motor via the flow of the extinguishing agent;

driving the output shaft of the motor via the motor;

discharging the extinguishing agent from the outlet of the motor into the admixing line;

driving the input shaft of the admixing pump via the output shaft of the motor;

driving the admixing pump via the input shaft;

supplying the extinguishing agent additive through the extinguishing agent additive inlet line to the fluid input of the admixing pump;

pumping the extinguishing agent additive via the admixing pump;

discharging the extinguishing agent additive from the at least one first return-flow-capable fluid output of the admixing pump depending on the position of the switching device into the return flow line or into the extinguishing agent additive outlet line;

discharging the extinguishing agent additive from the remaining, non-return-flow-capable fluid outputs of the admixing pump into the extinguishing agent additive outlet line;

admixing the extinguishing agent additive into the extinguishing agent in the admixing line at the admixture point; and dispensing the extinguishing agent/extinguishing agent additive mixture (premix) at the second outlet-side end of the admixing line.

* * * * *